United States Patent
Fuller et al.

(10) Patent No.: US 6,531,981 B1
(45) Date of Patent: Mar. 11, 2003

(54) GLOBAL AUGMENTATION TO GLOBAL POSITIONING SYSTEM

(75) Inventors: Richard A. Fuller, Los Gatos, CA (US); Roger Hayward, San Francisco, CA (US); Jock Christie, San Anselmo, CA (US)

(73) Assignee: SkyNetix, LLC, Fountain Valley, CA (US)

( * ) Notice: Subject to any disclaimer, the term of this patent is extended or adjusted under 35 U.S.C. 154(b) by 0 days.

(21) Appl. No.: 09/845,753

(22) Filed: Apr. 30, 2001

Related U.S. Application Data

(60) Provisional application No. 60/200,958, filed on May 1, 2000.

(51) Int. Cl.$^7$ ................................................. G01S 5/14
(52) U.S. Cl. ............................... 342/357.03; 701/215
(58) Field of Search ................ 342/357.03; 701/214, 701/215

(56) References Cited

U.S. PATENT DOCUMENTS

| | | | | | |
|---|---|---|---|---|---|
| 6,040,798 | A | * | 3/2000 | Kinal et al. | 342/357.01 |
| 6,061,632 | A | * | 5/2000 | Dreier | 701/215 |
| 6,249,245 | B1 | * | 6/2001 | Watters et al. | 342/357.03 |
| 2002/0024461 | A1 | * | 2/2002 | Moeglein et al. | 342/357.1 |

OTHER PUBLICATIONS

Lawrence, David et al, "Integration of Wide Area DGPS with Local Area Kinematic DGPS", IEEE Plans, 1996, pp. 523–529, A 1996.*

* cited by examiner

Primary Examiner—Gregory C. Issing
(74) Attorney, Agent, or Firm—Townsend and Townsend and Crew LLP

(57) ABSTRACT

A system and method is disclosed for corresponding data associated with primary correction of at least one first measurement of a GPS satellite characteristic to a second measurement of the GPS satellite characteristic taken at a mobile receiver. In a preferred embodiment of the invention, a first processor is coupled to at least one wide-area GPS corrections receiver and at least one local-area GPS corrections receiver. The wide-area and local-area receivers operate to determine the first measurement and secondary data associated with correction of the determined first measurement. In operation, an estimate of the location of the mobile receiver is determined by the first processor. The availability to the mobile receiver of the secondary correction data from the wide-area and local-area GPS corrections receivers is determined, preferably based on the location estimate. From the secondary correction data, primary data representing the primary correction is determined by the first processor. The primary data and the second measurement data are preferably colocated by causing the first processor to transmit the primary correction data to the mobile receiver.

9 Claims, 6 Drawing Sheets

GLOBAL AUGMENTATION TO GLOBAL POSITIONING SYSTEM

CROSS-REFERENCES TO RELATED APPLICATIONS

This application claims the benefit of U.S. provisional patent application serial No. 60/200,958 filed May 1, 2000, which is hereby incorporated herein by reference in its entirety.

BACKGROUND OF THE INVENTION

User GPS receiver architectures vary widely and can supply a wide variety of measurements in addition to pseudorange and continuous carrier phase, the two primary characteristic measurements from GPS. Pseudorange, $\rho_u^k$ from Equation (1) below, is the receiver measurement of the geometric range to the satellite with degradation from satellite and receiver clock errors, the atmosphere and receiver errors. The second primary measurement of the receiver is the continuous carrier phase, $\phi_u^k$ in Equation (2) below. Continuous carrier phase shares the same degradation factors as the pseudorange, but an additional uncertainty is added since the wavelength of the carrier is only 19 centimeters and has an integer ambiguity that is difficult to resolve in real-time.

As implied by Equations (1) and (2), a number of factors conspire to corrupt the pseudorange and carrier phase measurements for GPS. These errors are summarized below.

$$\rho_u^k = r_u^k \cdot 1_u^k + b_u - B^k + I_u^k + T_u^k + v_u^k \quad (1)$$

$$\phi_u^k = r_u^k \cdot 1_u^k + b_u - B^k + I_u^k + T_u^k + N_u^k \lambda_{L1} + \xi_u^k \quad (2)$$

where $\rho_u^k$ = the pseudorange from the user receiver, u, to the $k^{th}$ satellite $\phi_u^k$ = the continuous carrier phase from the user receiver, u, to the $k^{th}$ satellite $1_u^k$ = the line-of-sight from the user receiver, u, to the $k^{th}$ satellite $r_u^k \cdot 1_u^k$ = the calculated range from the user receiver, u, to the $k^{th}$ satellite $b_u$ = the user receiver clock offset from GPS time $B^k$ = the $k^{th}$ satellite clock offset from GPS time $I_u^k$ = the ionospheric delay along the line-of-sight from the user receiver, u, to the $k^{th}$ satellite $T_u^k$ = the tropospheric delay along the line-of-sight from the user receiver, u, to the $k^{th}$ satellite $N_u^k$ = the continuous phase cycle ambiguity from the user receiver, u, to the $k^{th}$ satellite $\lambda_{L1}$ = the L1 carrier phase wavelength, 0.1903 meters $v_u^k$ = the pseudorange measurement error $\xi_u^k$ = the carrier phase measurement error Clock errors are mostly due to the degradation associated with Selective Availability (SA). This intentional degradation corrupts the range accuracy by values up to several tens of meters. Studies shown it reasonable to assume that the overwhelming majority of SA errors are from clock perturbations. The US Government deactivated SA on May 2, 2000, indicating that it will not be enabled again.

Ionospheric delay is caused when the GPS signal encounters the ionosphere. The carrier wave is advanced while the code phase is delayed. These effects are partially corrected for the single-frequency user by the Klobuchar ionospheric parameters broadcast in the GPS message itself. Dual frequency receivers can, for the most part, remove these effects directly.

Tropospheric delay can be up to 30 meters for low elevation satellites due to GPS signal propagation through the lower atmosphere (troposphere). There are two primary components of the tropospheric delay, dry and wet. The dry component makes up about 90% of the total delay and can be modeled well with surface pressure data. The wet component is much more difficult to model and not well correlated with surface conditions. The wet term can add as much as 2–3 meters of uncorrected error on the GPS measurements.

Ephemeris errors occur when the reported satellite position does not match the actual position. The component of these errors along the line of sight to the user is usually less than a few meters.

Multipath errors are due to local reflections of the signal near the receiver and are tracked with delay, corrupting the range and phase measurements. These effects are very sensitive to the local environment. Tall buildings are the most commonly encountered source of the reflections that cause multipath interference.

Receiver noise is comprised of thermal noise, signal and modeling quantization. These errors are usually limited to about 1 meter for pseudorange and 1 mm for carrier phase.

Since many of the above-discussed errors are common-mode for receivers that are sufficiently proximal to one another, it is possible to use measurements from one GPS receiver at a known reference location to correct the measurements of the nearby "mobile" receiver (a mobile receiver may be in motion or stationary; "mobile" is meant to indicate its usual location being unfixed with respect to the earth's surface). At the limit, for two receivers that share the same antenna, the only residual errors that would remain are due to receiver noise.

Using GPS measurements from one or more GPS receivers to correct another GPS receiver is called differential GPS (DGPS). Every DGPS system contains three system elements: 1) a single receiver or multiple GPS receivers at known reference (fixed) locations; 2) a mobile (unfixed) receiver; and 3) a communication link between the reference receiver(s) and the mobile unit.

Local-Area Differential GPS consists of a single reference station (a GPS receiver) at a known location measuring the errors in the pseudorange and broadcasting pseudorange corrections to mobile receiver users or a data processing and storage system via a data link. Other measurements and information from the satellites may also be received by the local-area differential GPS reference station and transmitted via the data link. Such other measurements/information includes the satellite almanac, ephemeris, carrier phase, pseudodoppler, phase bias, frequency bias, clock offset, signal strength, local angles of elevation and azimuth, and others. The operating presumption is that errors observed by a mobile user are nearly identical to those observed by a nearby reference receiver. Errors typically excepted from this presumption are local phenomena such as multipath and receiver noise. In the extreme case where the location of the mobile unit and the reference station are the same, all error sources except for multipath and receiver noise cancel out.

Local-area differential GPS can reduce position errors to as little as 0.5 meters (with smoothing). However, local-area differential GPS systems suffer from a high sensitivity to the proximity of the user to the reference station. Beyond a separation of, typically, 100 kilometers the solution degrades to an unacceptable degree. As such, for functionally acceptable DGPS corrections to be available over the entire Coterminous United States (CONUS), over 500 stations are required.

The use of wide-area differential GPS for the aviation community is currently under development by the FAA and is called the Wide Area Augmentation System (WAAS). The data link employed by this system is a geostationary satellite, which has a semi-major axis of 42,000 km and a nearly zero degree inclination. The major advantage of this satellite orbit configuration is that it is synchronous with the rotation of the Earth and, therefore, is at all times in a practically fixed position relative to mobile receiver users and reference stations.

The principle behind wide-area differential GPS is the use of multiple GPS reference stations to form "vector" corrections for each satellite in view of all or a subset of the GPS reference stations. The vector corrections are broken down into the components of the error sources to GPS. In a wide-area differential GPS system, the corrections include satellite ephemeris, satellite clock and the ionosphere. As in local-area differential GPS systems, multipath errors and receiver noise are not corrected, as these are purely local phenomena related exclusively to the mobile unit. The vector corrections are formed by making simultaneous measurements at multiple reference stations of the same GPS satellite observables. Observables that are recorded at the reference stations include pseudorange, pseudodoppler, carrier phase, and signal levels. Once the corrections are formulated, they are transmitted to geostationary satellites that re-broadcast the corrections to mobile users tracking the geostationary satellite. The mobile user tracks both the GPS satellites and the geostationary satellites and can thus derive pseudorange measurements not only from the GPS satellites but also the geostationary satellite. While the resultant GPS measurements, assisted by the broadcast corrections from the geostationary satellites, are more accurate, additional range sources may be used to supplement GPS. However, the vector corrections from the system are only available through the geostationary satellite. The wide-area system under development by the FAA is a "closed" system meaning that the measurements are not directly available to mobile receiver users.

What is needed in the art is a system design that offers wide-area GPS corrections that can be augmented with local corrections. Such a system should enable such wide- and local-area measurements to be colocated and corresponded with a measurement taken by a mobile receiver to accurately correct the measurement taken by the mobile receiver.

BRIEF SUMMARY OF THE INVENTION

In accordance with the present invention, a system and method is disclosed for corresponding data associated with primary correction of at least one first measurement of a GPS satellite characteristic to a second measurement of the GPS satellite characteristic taken at a mobile receiver.

In a preferred embodiment of the invention, a first processor is coupled to at least one wide-area GPS corrections receiver and at least one local-area GPS corrections receiver. The wide-area and local-area receivers operate to determine the first measurement and secondary data associated with correction of the determined first measurement. A second processor is optionally provided for receiving both the primary correction data from the first processor and data representing the second measurement taken at the mobile receiver.

In operation, an estimate of the location of the mobile receiver is determined by the first processor. The availability to the mobile receiver of the secondary correction data from the wide-area and local-area GPS corrections receivers is determined, preferably based on the location estimate. From the secondary correction data, primary data representing the primary correction is determined by the first processor.

If local-area secondary data is available to the mobile receiver, the primary data comprises a linear combination of all available secondary data. The linear combination comprises weighting of the local-area secondary data in proportion to distance from the mobile receiver to each local-area receiver from which the secondary data was available. If only wide-area secondary correction data is available to the mobile receiver, the primary data consists only of such wide-area data.

The primary data and the second measurement data are preferably colocated by causing the first processor to transmit the primary correction data to the mobile receiver. Alternatively, the primary data and the second measurement data are colocated by transmitting the second measurement to the first processor or optional second processor.

In further accordance with the present invention, a wide-area reference station records the wide-area system vector corrections as well as local-area differential GPS measurements. This ensemble of information along with the satellite almanac, ephemeris, and other data is transmitted to a central collection and processing center for refinement and integration with information from other wide-area and local-area reference receivers. This represents a system design that offers wide-area GPS corrections that can be augmented with local corrections. Such a system enables such wide- and local-area measurements to be colocated and corresponded with a measurement taken by a mobile receiver to accurately correct the measurement taken by the mobile receiver.

BRIEF DESCRIPTION OF THE DRAWINGS

FIG. 3b illustrates in greater detail the elements of data collection element 308 of FIG. 3a.

DETAILED DESCRIPTION OF THE INVENTION

Figure 1:
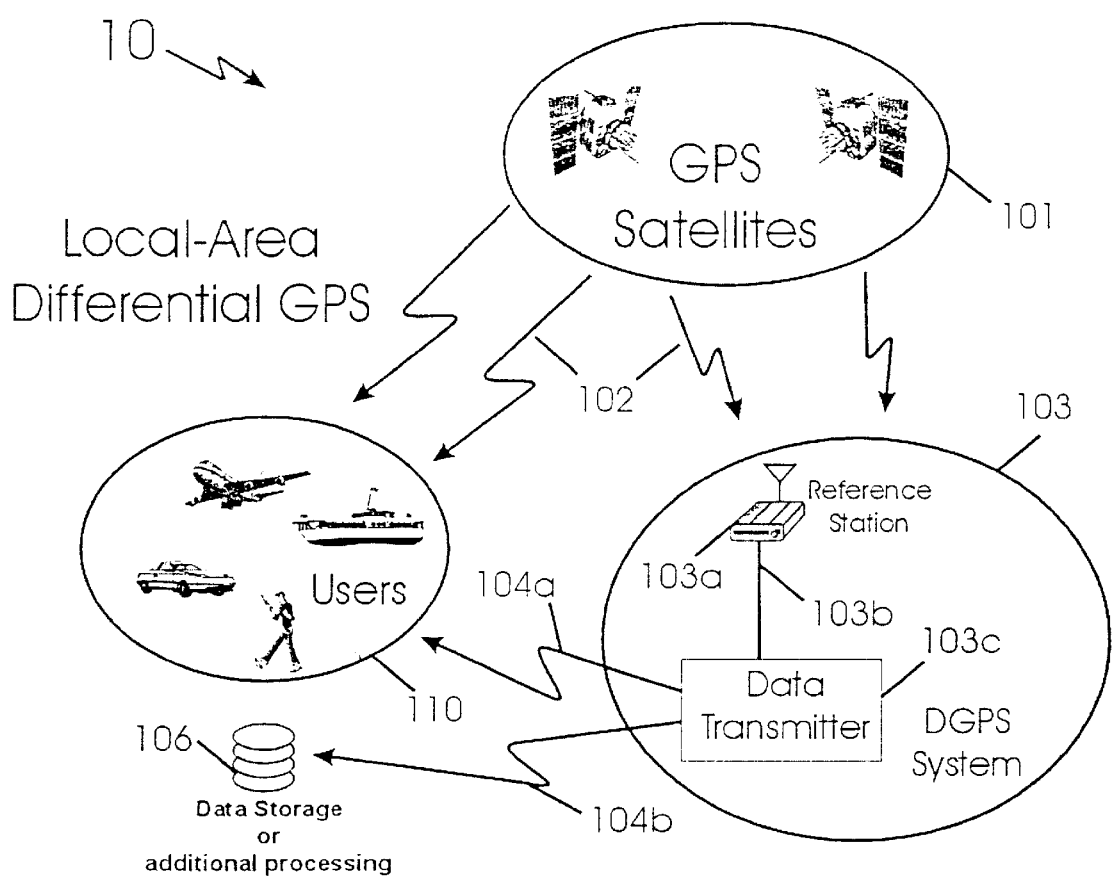
FIG. 1 is a schematic illustration of a prior art local-area differential GPS receiver system.

FIG. 1 is a schematic illustration of a local-area differential GPS receiver system 10 known in the art. GPS satellites 101 broadcast signals 102 that are received by user GPS receivers 110 and local-area differential correction system 103. Differential correction system 103 is comprised of GPS reference receiver 103a and a communication link 103b to a data transmitter 103c. The data carried by signals 102 may contain multiple types of information, including but not limited to, satellite ephemeris, satellite almanac, satellite signal strength indication, pseudorange, pseudodoppler, etc. The data transmitter 103c transmits this data through a data interface 104a to user GPS receivers 110, or to data storage or further processing 106 via data interface 104b. Data interfaces 104a, 104b can be achieved through wireless links or with land-based communication media.

Figure 2A:
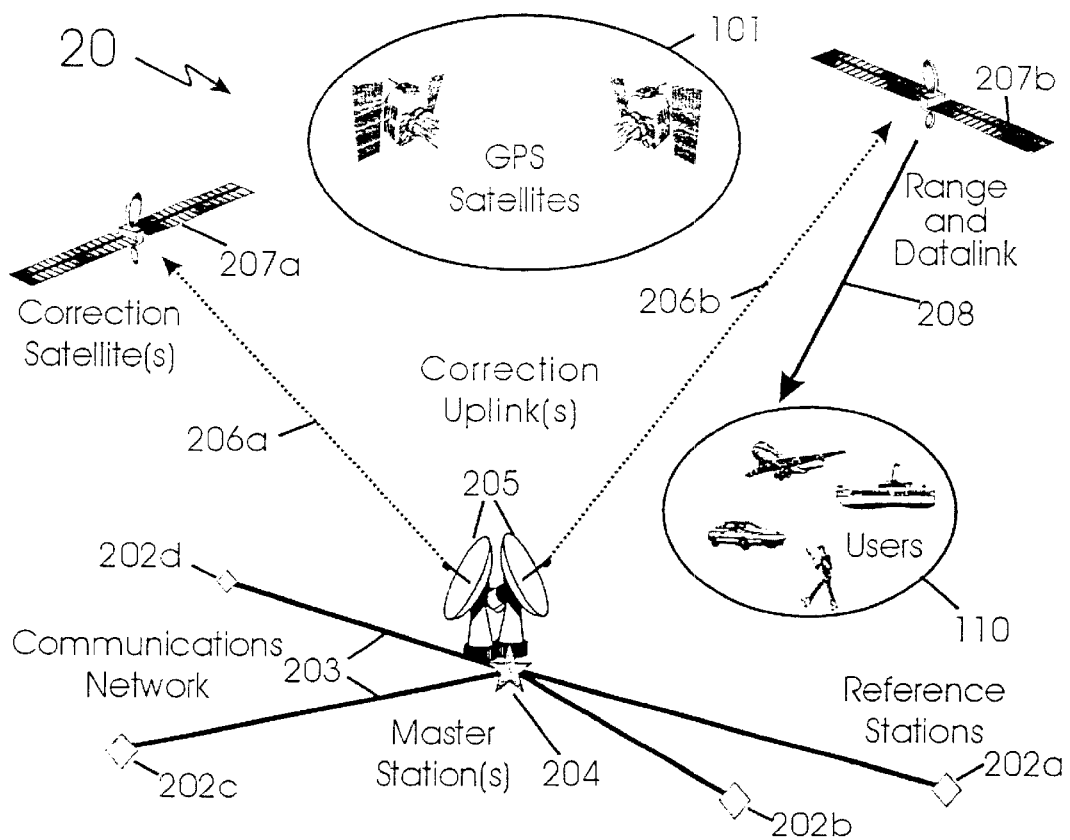
FIG. 2a is a schematic illustration of a prior art system used for the formulation and broadcast of wide-area differential GPS corrections.

FIG. 2a is a schematic illustration of a system 20 used for the formulation and broadcast of wide-area differential GPS corrections and known in the art. GPS satellites 101 broadcast signals that are received by user GPS receivers 110 and reference differential correction stations, 202a, 202b, 202c, 202d. The reference differential correction systems are connected to a master station 204 via a communications network 203. The master station (or stations), 204, computes the vector-based corrections for a wide-area system and sends these corrections to the uplink (or uplinks), 205. The correction uplinks, 205, broadcast the vector-based corrections on satellites, 207a, 207b, via connections 206a and 206b, respectively. The broadcasts from satellites 207a, 207b could represent transmissions from the same master station (or stations) or from a separate network of wide-area differential GPS reference stations. The vector-based corrections are sent by the satellites, 207a, 207b, via the communication link, 208, to GPS users, 110. The GPS user equipment 110 must have modifications over standard GPS receivers to demodulate (or decode) the corrections broadcast received via the communication link, 208.

Figure 2B:
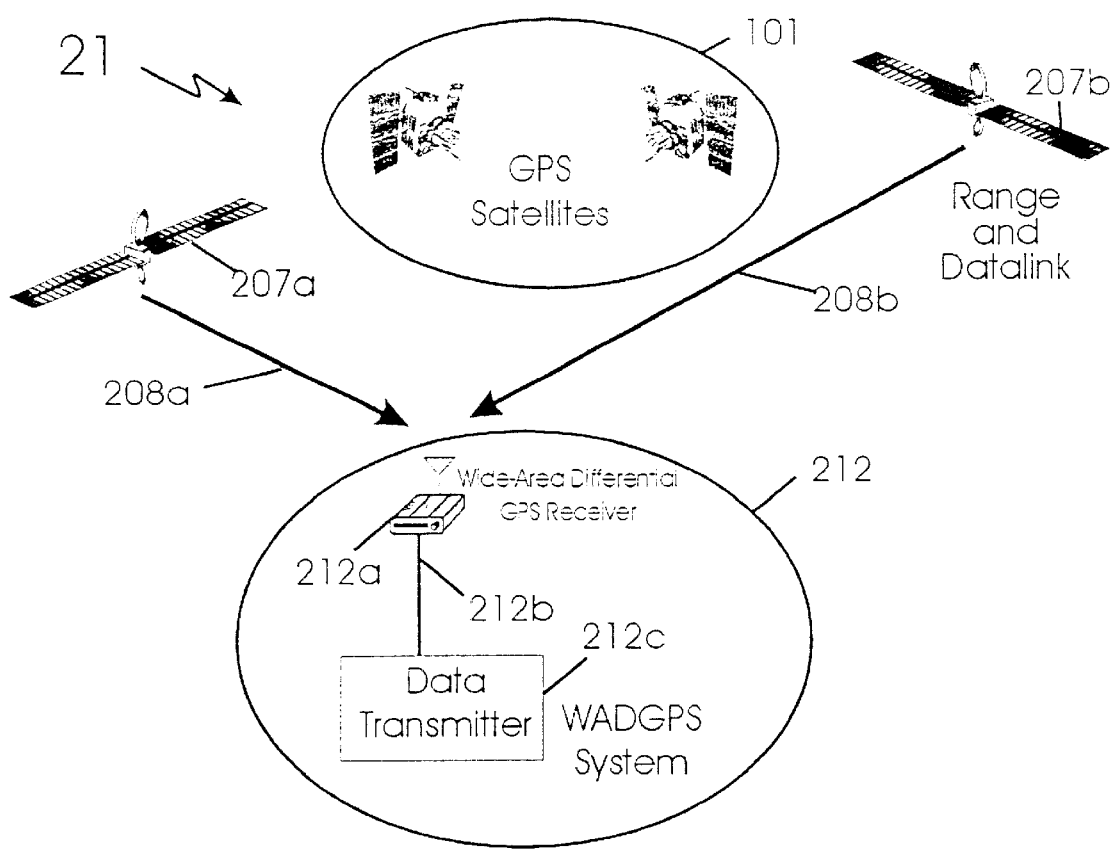
FIG. 2b is a schematic illustration of a prior art system used for the collection and broadcast of wide-area differential GPS corrections.

Alternatively, and as shown in FIG. 2b, the vector-based corrections are sent by the satellites 207a, 207b via the communication link 208 to a wide-area DGPS receiver element 212. Receiver element 212 comprises a wide-area differential GPS receiver 212a that receives signals from the GPS satellites 101 as well as one or more wide-area differential GPS satellites 207a, 207b. The data collected by the wide-area differential GPS receiver, 212a, is sent via the link 212b to the data transmitter, 212c, which makes the data available for external processing or storage.

Figure 3A:
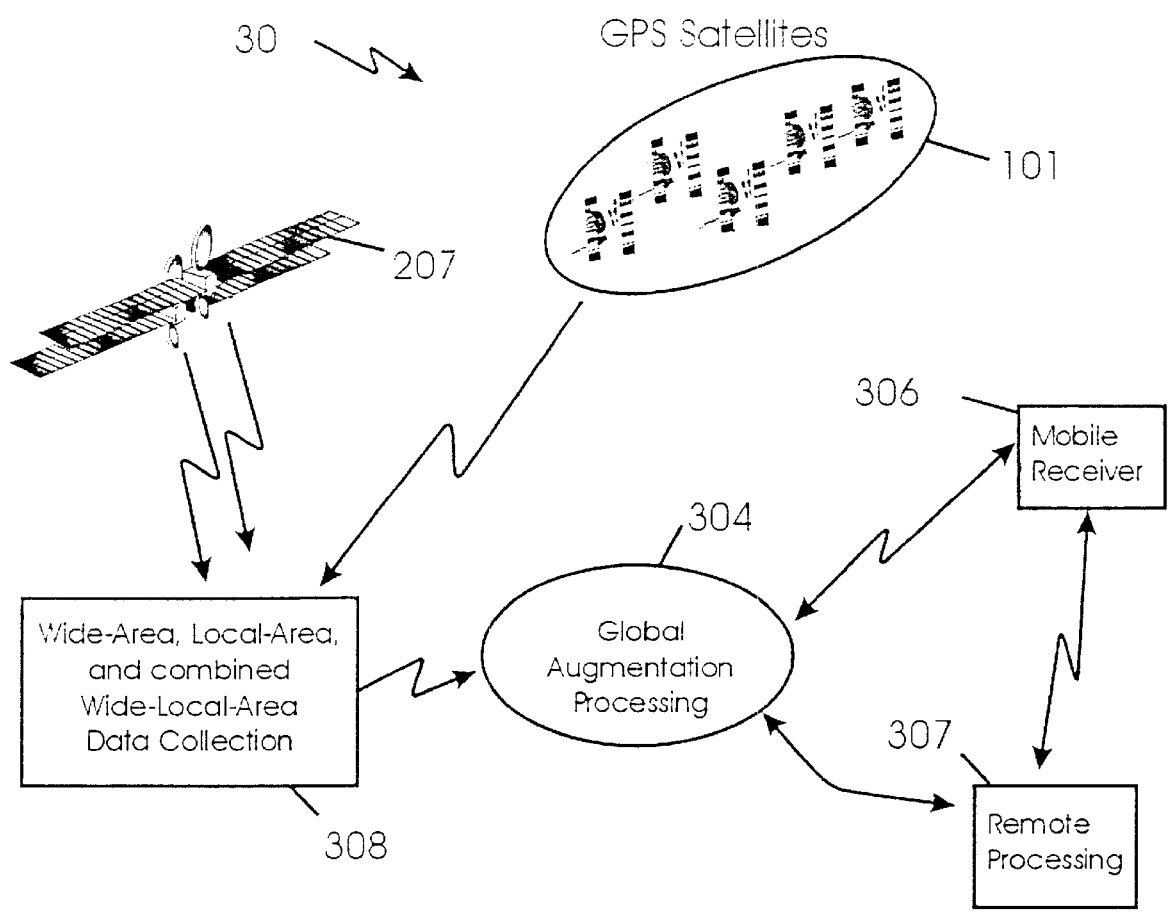
FIG. 3a is a schematic illustration of a system 30 for GPS error corrections processing according to principles of the present invention.

FIG. 3a is a schematic illustration of a system 30 for GPS error corrections processing according to principles of the present invention. System 30 comprises a data collection system 308 for wide and local area differential data that gathers data from the GPS satellites, 101, as well as the wide-area differential GPS satellites 207. As such, data collection system 308 is adapted to simultaneously directly receive data, with no reception or processing thereof by intermediate devices, from constellation 101 and satellites 207. System 30 further comprises a computer processing unit (processor) 304 and at least one mobile GPS signal receiver 306. An optional second processor 307 may be disposed in communication with processor 304 and mobile receiver 306.

Processor 304 is in communication with data collection system, 308, as a means of enabling local-area and wide-area corrections data processing as discussed below in greater detail. Processor 304 is further in communication with receiver 306. Processor 304 computes corrections to measurements taken from GPS satellite constellation 101. Specifically, these corrections are computed from a combination of measurements, including but not limited to pseudorange, pseudodoppler and continuous carrier phase, characterizing constellation 101 and taken by data collection system 308.

Figure 3B:
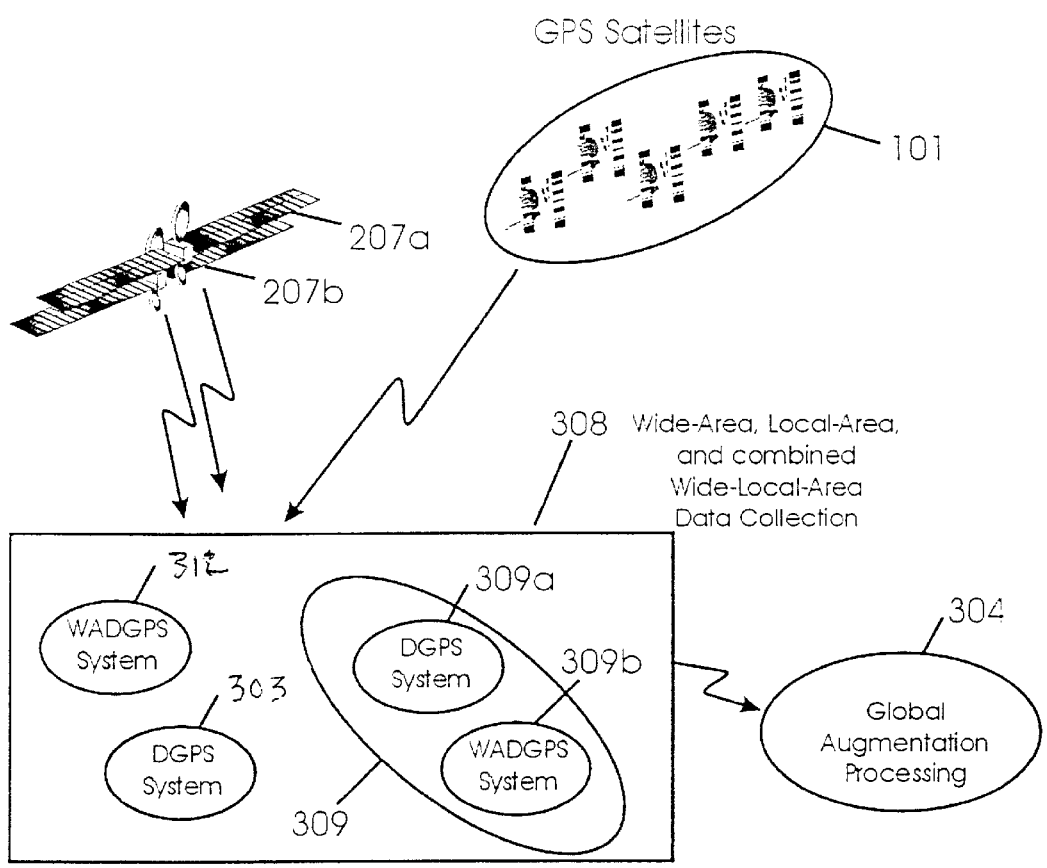

FIG. 3b illustrates in greater detail the elements of data collection element 308 of FIG. 3a. Data collection element 308 is preferably comprised of a wide-area differential GPS system 312 (functionally equivalent to system 212 illustrated in FIG. 2b) and a local-area differential GPS system 303 (functionally equivalent to system 103 illustrated in FIG. 1). Element 308 further comprises a colocated wide-area and local-area differential GPS system 309 having a local-area DGPS component 309a and a wide-area DGPS component 309b. Each of the elements of which element 308 is comprised has the ability to track, record and transmit GPS data for further processing by processor 304. The wide-area system 312 and the wide-area element 309b additionally have the ability to collect vector-based wide-area differential GPS corrections and transmit them to processor 304.

Figure 4:
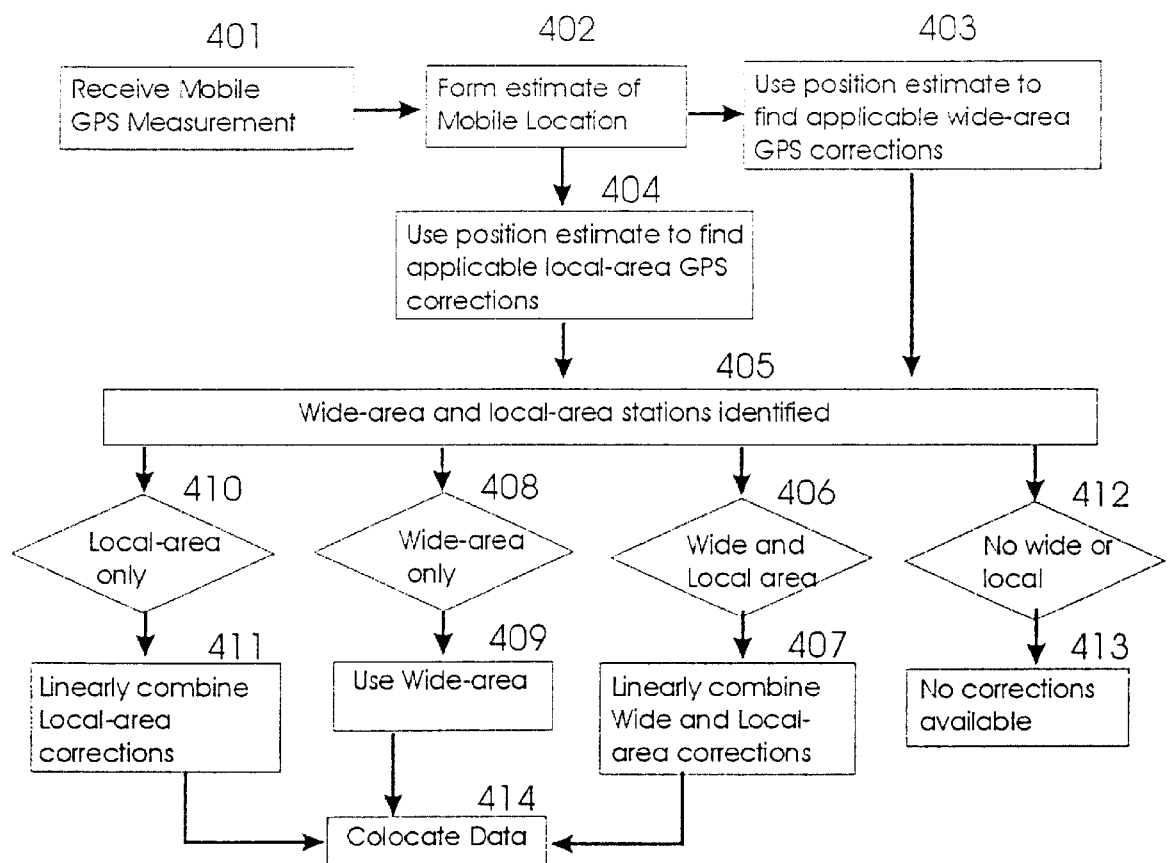
FIG. 4 is a flow diagram illustrating the process of data correspondence according to principles of the present invention.

FIG. 4 is a flow diagram illustrating the process of data correspondence according to principles of the present invention. At step 401, mobile receiver 306 transmits to processor 304 data representative of a measurement (illustratively, pseudorange) characterizing constellation 101 and received by receiver 306. At step 402, processor 304 converts the data received from receiver 306 into an estimate of the geographic position of receiver 306. At step 403, processor 304 uses this position estimate to determine if the current location of receiver 306 falls within the communication range of any wide-area receiver 312, 309b. At step 404, processor 304 uses this position estimate to determine if the current location of mobile receiver 306 falls within the communication range of any local-area receiver 303, 309a. Such a local-area range is preferably 1000 kilometers.

At step 405, processor 304 identifies the particular receivers 303, 312, 309 having a communication range within which mobile receiver 306 is located. Receivers 303, 312, 309 each operate to take a pseudorange measurement of at least one satellite of constellation 101 and determine secondary data directed to correction of the pseudorange measurement taken. This secondary data is communicated to processor 304.

If, as at step 406, processor 304 determines that communication from both local and wide-area receivers 303, 312, 309 is available, then at step 407 secondary correction data generated by such local-area and wide-area receivers 303, 312, 309 identified in step 405 is linearly combined in the measurement space along the line-of-sight from mobile receiver 306 to GPS constellation 101 to form the primary correction data. This linear combination will proportionally weight the local-area values based on the estimated distance from mobile receiver 306 to local-area receivers 303, 309a. The form of the correction is:

$$\Delta_u^k = \frac{\sum_{n=1}^{N} a_n d_u^n \cdot \Delta_n^k + a_w \cdot \Delta_w^k}{\sum_{n=1}^{N} a_n + a_w} \quad (3)$$

where $\Delta_u^k$=the correction between the kth satellite and user, u

N=the number of local-area differential GPS stations with corrections within 1000 km of the user, u $a_n d_u^n$=the relative weight of the nth local-area differential GPS correction which is a function of the distance between the station to the user $\Delta_u^k$=the correction returned from the nth local-area differential station of the kth satellite measurement $a_w$=the relative weight of the wide-area correction for the kth satellite $\Delta_w^k$=the wide-area correction for the kth satellite If, as at step 408, processor 304 determines that only communication from wide-area receivers 312, 309b is available, then at step 409 secondary correction data generated by such wide-area receivers 312, 309b identified in step 405 is used as the primary correction data.

If, as at step 410, processor 304 determines that only communication from local-area receivers 303, 309a is available, then at step 411 secondary correction data generated by such local-area receivers 303, 309a identified in step 405 is linearly combined to form the primary correction data. This linear combination will proportionally weight the local-area values based on the estimated distance from mobile receiver 306 to local-area receivers 303, 309a. The form of the correction is:

$$\Delta_u^k = \frac{\sum_{n=1}^{N} a_n d_u^n \cdot \Delta_n^k}{\sum_{n=1}^{N} a_n} \tag{4}$$

where the variables are defined as in Equation (3).

If, as at step 412, processor 304 determines that communication from neither local-area nor wide-area receivers 303, 312, 309 is available, then at step 413 processor 304 determines that no primary correction data is available for correspondence. Consequently, the default GPS signal correction generated by mobile receiver 306 will be employed.

Upon formation of the primary correction data, at step 414 the primary correction data is colocated with a pseudorange measurement (second measurement) taken by mobile receiver 306. The purpose of such colocation is to allow combination of the primary correction data and the second measurement as a means of optimizing correction of the second measurement, thus resulting in optimally accurate readings provided by mobile receiver 306. Colocation is preferably accomplished by causing processor 304 to transmit the primary correction data to mobile receiver 306. In an alternative embodiment, colocation may be accomplished by causing mobile receiver 306 to transmit the second measurement to processor 304. In another alternative embodiment, colocation may be accomplished by causing mobile receiver 306 to transmit the second measurement to second processor 307 and causing processor 304 to transmit the primary correction data to second processor 307.

Although the invention has been described in terms of the illustrative embodiment, it will be appreciated by those skilled in the art that various changes and modifications may be made to the illustrative embodiment without departing from the spirit or scope of the invention. For example, characteristics other than pseudorange or carrier frequency, such as Doppler (velocity), Doppler rate (acceleration), carrier-to-noise ratio (signal strength), elevation above local-level horizon, azimuth and others may be employed in practicing the present invention. It is intended that the scope of the invention not be limited in any way to the illustrative embodiment shown and described but that the invention be limited only by the claims appended hereto.

What is claimed is:

1. A system for corresponding data associated with primary correction of at least one first measurement of a GPS satellite characteristic to data representing a second measurement of the GPS satellite characteristic taken at a mobile receiver, the system comprising:
   a first processor adapted to compute primary data representing the primary correction;
   at least one wide-area GPS corrections receiver coupled to said processor; and
   at least one local-area GPS corrections receiver coupled to said processor,
   wherein said wide-area and local-area receivers are adapted to determine secondary data associated with correction of said determined first measurement,
   wherein said local-area secondary data is weighted proportionally according to distance from the mobile receiver to a one of said at least one local-area receiver from which said secondary data was received, and
   wherein said wide-area secondary data is weighted relative to the local-area secondary data.

2. The apparatus of claim 1, wherein said first processor is adapted to transmit said primary correction data to the mobile receiver.

3. The apparatus of claim 1, wherein said first processor is adapted to receive the second measurement data.

4. The apparatus of claim 1, further comprising a second processor, said second processor adapted to receive said primary correction data from said first processor, said second processor adapted to receive the second measurement data.

5. A method of corresponding data associated with primary correction of at least one first measurement of a GPS satellite characteristic to data representing a second measurement of the GPS satellite characteristic taken at a mobile receiver, the method comprising:
   determining the availability to the mobile receiver of secondary correction data from at least one wide-area GPS corrections receiver and at least one local-area GPS corrections receiver;
   determining, from said secondary correction data, primary data representing the primary correction; and
   colocating said primary data and the second measurement data,
   wherein said determining primary data comprises linearly combining said available secondary data,
   wherein said linearly combining comprises weighting said local-area secondary data proportionally according to distance from the mobile receiver to a one of said at least one local-area receiver from which said secondary data was available, and
   wherein said wide-area secondary data is weighted relative to the local-area secondary data.

6. The method of claim 5, further comprising determining an estimate of the location of the mobile receiver.

7. The method of claim 6, wherein said availability determination is based on said estimate.

8. The method of claim 5, wherein said colocating comprises transmitting said primary correction data to the mobile receiver.

9. The method of claim 5, wherein said colocating comprises transmitting the second measurement data to a processor.

* * * * *